Oct. 5, 1943.     I. I. LEVENSTEIN     2,330,899
FISH RACE APPARATUS
Filed June 12, 1940     3 Sheets-Sheet 1
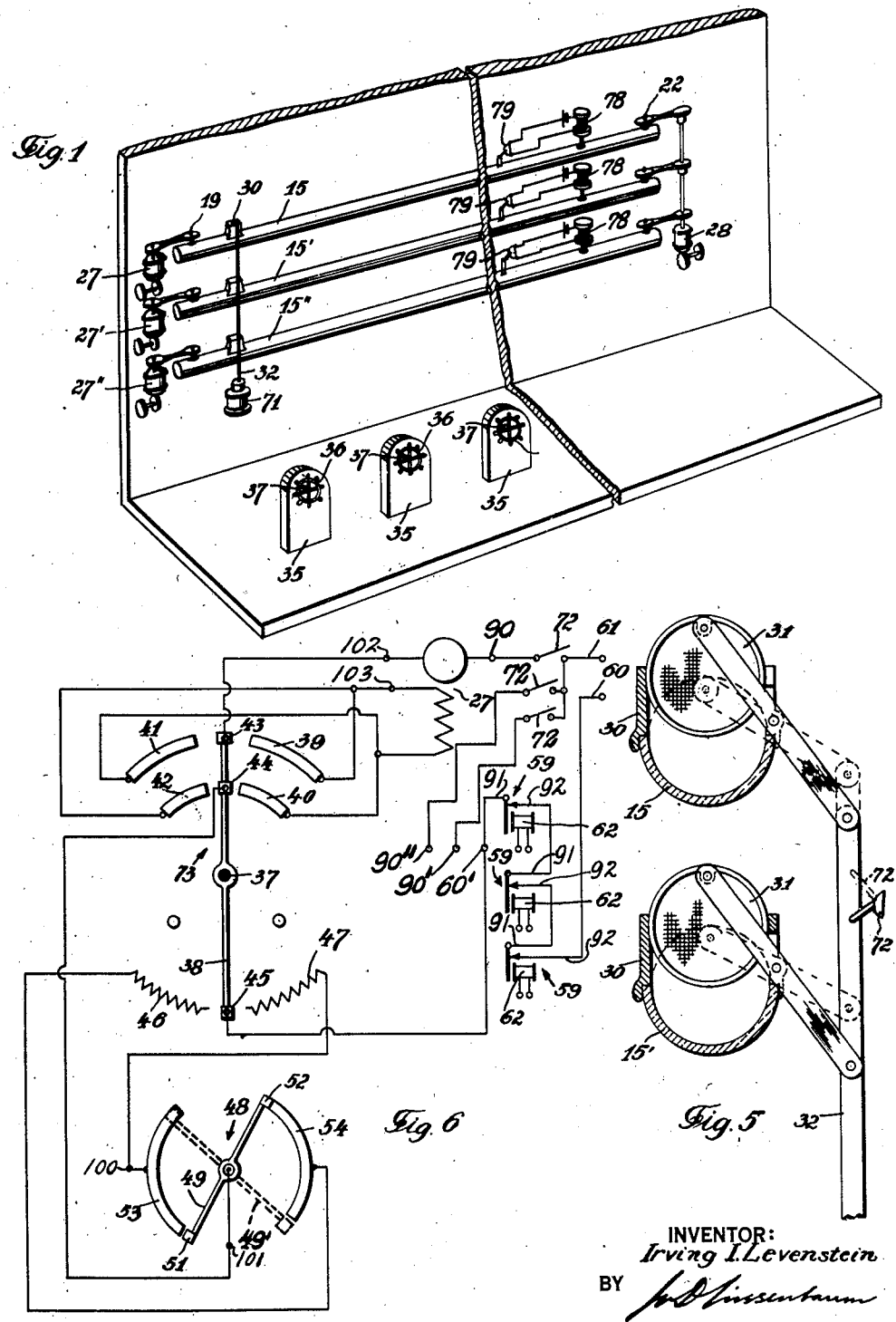
INVENTOR:
Irving I. Levenstein
BY
ATTORNEY

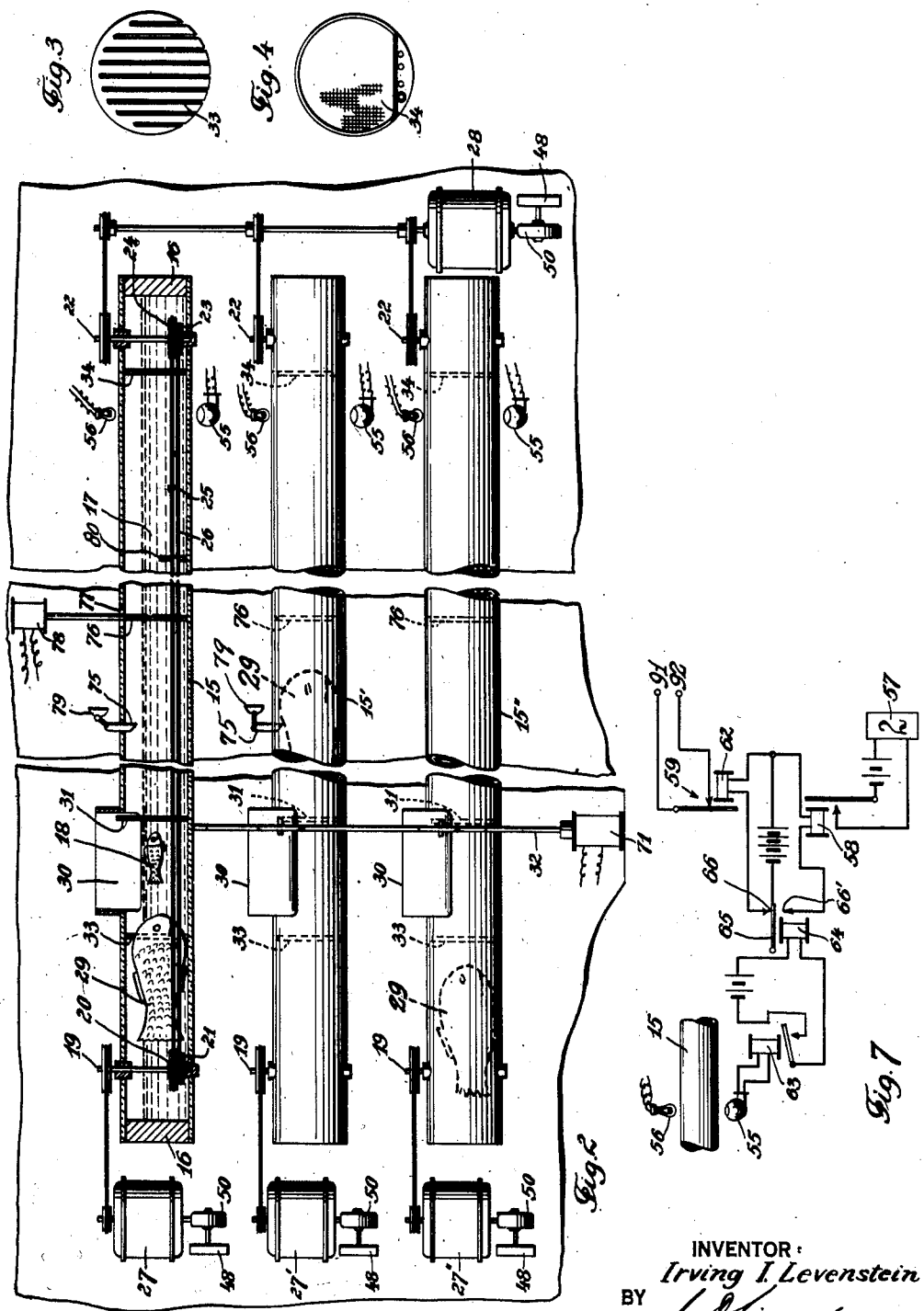

INVENTOR.
Irving I. Levenstein
BY
ATTORNEY

Patented Oct. 5, 1943

2,330,899

UNITED STATES PATENT OFFICE 2,330,899

FISH RACE APPARATUS

Irving L. Levenstein, Brooklyn, N. Y.

Application June 12, 1940, Serial No. 340,054

39 Claims. (Cl. 119—15.5)

The present invention relates to fish race apparatus, and more particularly to the type in which live fish are employed.

An object of this invention is to provide an apparatus of the character mentioned, of novel and improved construction, wherein the fish during the period of the race, are free to move as they desire, yet the persons in the contest, can in a manner attempt to control the movement of their respective entries, to urge them towards the goal, which urging efforts may even cause the fish to perform differently than is desired; thereby making it a game which is extremely interesting, exciting and stimulating and for some of the players quite provoking, however all in fun for the contestants and spectators and always informative as to fish habits and behavior.

Another object of this invention is to provide a fish race apparatus of novel and improved construction, wherein as soon as one of the fish reaches the goal, such fact is indicated by a signal means, and simultaneously all of the players' controls can no more manipulate any of the apparatus.

A further object of this invention is to provide an improved and novel apparatus of the type described, wherein the racing time may be prolonged under like conditions for all the fish, if such is initially intended as one of the rules or manipulations of the game.

Still another object of this invention is to provide a novel and improved apparatus of the character mentioned, wherein the live fish is protected from being harmed by any moving parts, and wherein all parts moving within the raceways have automatically limited movements.

Another object hereof is to provide a game or race apparatus of novel and improved construction, wherein a part of the raceway may be closed to the fish for an interval of time controlled by the player, and wherein in the goal portion of the raceway and in the immediately preceeding region, the fish is entirely on its own, subject to no urging or manipulative movement on the part of the persons engaged in the contest, and further, wherein all of the fish are returned to starting position after one of them has reached the goal.

Other objects will become manifest as this disclosure proceeds.

In the accompanying drawings forming part of this application, similar characters of reference indicate corresponding parts in all the views.

Fig. 1 is a partly diagrammatic and partly perspective view of an embodiment of this invention.

Fig. 2 is an enlarged front view of the raceways and associated mechanism in part; showing one of the raceways in section.

Fig. 3 shows a screen used to shield the live fish from various moving parts of the mechanism.

Fig. 4 shows a screen plate which is movably positioned in the raceway and is used to push the fish back to the starting region in the raceway.

Fig. 5 is an enlarged fragmentary section showing the gates employed at the starting point, in linked relation for simultaneous operation.

Fig. 6 is a wiring diagram of the circuit which may be employed for controlling the performance of each of the electric motors included in the apparatus.

Fig. 7 is a wiring diagram of the circuit which may be employed to actuate a signal means to indicate the winner, and for simultaneously opening the circuits of all the motors controlled originally by the persons engaged in the game as players.

Figure 8:
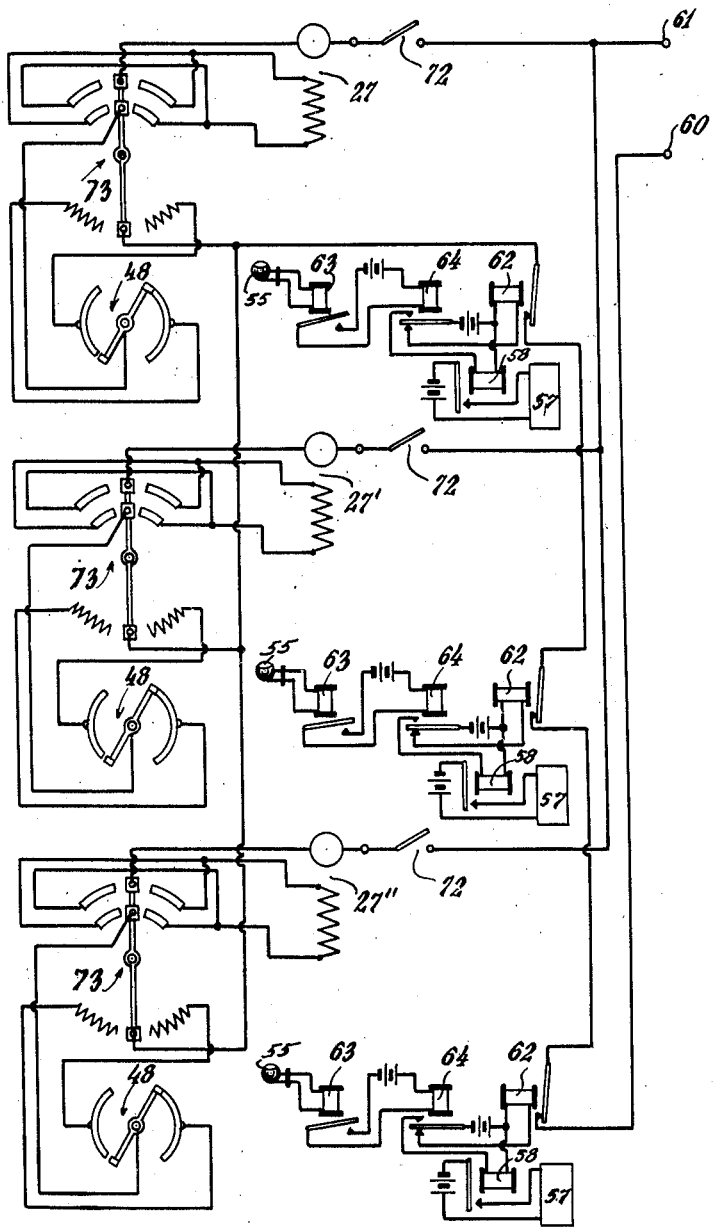
Fig. 8 is the wiring diagram of the circuit of three motors employed herein and of the associated signal and circuit opening means.
Figure 9:
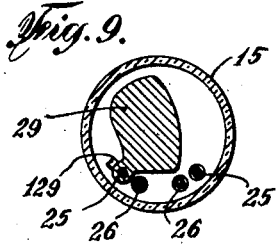
Fig. 9 is a section through the raceway and a lure member therein, showing the attachment of said lure member to one of the strands of one of the belts within said raceway.
Figure 10:
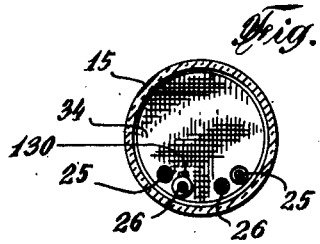
Fig. 10 is a similar view showing the attachment of the screen plate of Fig. 4 to one of the strands of a second belt within said raceway.

In the drawings, the numerals 15, 15' and 15" designate raceways which may be tubular and made of glass, lucite or other suitable material preferably transparent, closed at the ends by elements 16, so that said raceways may hold water 17 for a live fish 18 in each of them. These raceways, for convenience, may be mounted in parallel relation, and what is said of one of them, applies to all.

At one end of the raceway, and through its interior, is mounted a shaft 19 having secured thereon a pulley 20, and a loose pulley 21; said pulleys preferably lying near the floor of the raceway. At the other end of the raceway, and through its interior, is mounted a shaft 22, having secured thereon a pulley 23, and a loose pulley 24. An endless belt 25, of bronze wire, gut or other suitable substance, is mounted about the pulleys 20 and 24, while a similar belt is mounted about the pulleys 21 and 23, and is indicated by the numeral 26. Each shaft 19 is adapted to be driven by an independent electric motor, namely the motors 27, 27' and 27'' respectively, while the shafts 22 may all together be driven by a single motor 28. In the embodiment illustrated, belt drives are shown as suitable between motors and shafts.

To one of the strands of the belt 25, at 129, is secured a member 29, preferably made in the shape of a fish of a cross section which is less than that of the raceway tube, so that the live fish 18 may have sufficient, but not too much, room to pass said member 29 within the raceway. The function of the member 29, when moved along the raceway, is either to chase or lure the fish 18 towards the goal region of the raceway, wherefore said member 29 is hereinafter referred to as the urging member. It is evident that upon rotation of the motor 27, the urging member 29 will move within its raceway 15. Upon rotation of the motor 27', the urging member within the raceway 15' will move therealong, and the like may be said as to all the raceways. Of course, for a contest, it is advisable to have but one fish 18 within a raceway, and therefore the apparatus shall include as many raceways as are necessary to accommodate the number of players intended to play at one time.

The numeral 30 indicates a framed opening in the top of the raceway near one end thereof, which shall be designated as the starting end, as distinguished from the goal end of the raceway. Gates 31 at the sides of the openings towards the goal ends of the raceways, are adapted to be simultaneously lifted or lowered in the respective raceways of the apparatus, by movement of the rod 32 to which said gates are suitably linked, while at the other side of the opening 30, is a fixed slitted partition 33, made of rubber or other suitable substance, which permits the urging member 29 to pass therethru, but through which the live fish 18 will not travel, for it is found that so far as the fish is concerned, it is treated as a solid wall. It is obvious that said member 33 keeps the fish 18 away from the shaft 19, and that when the gate 31 is lowered, an enclosure is formed for the live fish at the starting point of the raceway.

To one of the strands of the belt 26, at 130, is secured a perforated plate member 34 positioned to partition the raceway 15. This screen is used to push the fish 18 to initial position at the opening 30, after a race is finished. A single motor 28 may be employed for driving all the shafts 22, which motor is preferably controlled by an attendant.

The numeral 35 indicates generally the controls to be operated by the persons engaged in the game. These controls 35, are one for each of the motors 27, 27' and 27''. Of course, there are as many control units as there are raceways. These controls 35 present a wheel 36 mounted on a shaft 37. It is intended that upon rotation of the wheel 36 in a clockwise direction, the urging member 29 shall move to the right towards the goal end of the raceway 15, and when turned counterclockwise, said urging member 29 shall move to the left along the raceway. It is also intended to limit the range of travel of the urging member 29 and to control its velocity if desired, and it is further intended to limit the distance of travel of the plate member 34; the inclusion of means to control its velocity may be deemed superfluous.

For the control of the individual motors, reference is had to the circuit shown in Fig. 6. The arm 38, mounted on shaft 37, together with the arcual metal segments 39, 40, 41 and 42, and the insulated brushes 43, 44 and 45, which metal segments are fixed, and which brushes are carried on the arm 38, constitute a reversing switch for the motor related to the specific control 35. The numerals 46 and 47 are rheostats and the numeral 48 indicates an automatic cut-off switch, the movement of whose arm 49 is controlled by a reduction gear unit 50 driven by the particular motor concerned. The arm 49 carries at its respective ends, the electrically connected brushes 51 and 52 extending laterally from said arm in one direction and adapted to contact the arcual metal members 53 and 54. The arcual lengths of members 53 and 54 are such that when brush 51 is moved out of contact from member 53, brush 52 is still in contact with member 54, and that when brush 52 travels "downward" in Fig. 6, the full length of member 54 and is out of contact therewith, brush 51 will still be in contact with member 53, as indicated by 49'. Hence member 29 due to action of the motor controls 48, cannot be made to travel further in any given direction after said member 29 has reached the furthest position of its travel in any given direction.

The circuit is open when arm 38 is in vertical position, meaning there is no contact between any of the brushes it carries with any of the segments 39, 40, 41 or 42. Movement by the player of his control wheel 36 in a clockwise direction, will cause arm 38 to move clockwise, whereupon brush 43 will contact arcual segment 39, brush 44 will contact segment 40, and brush 45 will contact with the unconnected end of the coil of the rheostat 46, whereby the whole of the resistance of said rheostat is within the circuit and the motor 27 will rotate slowly in a clockwise direction. Further clockwise movement of wheel 36, will only serve to decrease the portion of the rheostat in circuit, hence increase the speed of the motor. Of course, upon clockwise rotation of the motor 27, it is evident that the urging member 29 will move to the right or goal end of the raceway 15, and its velocity is varied in accordance with the position of the arm 38. Rotation of motor 27, will cause arm 49 to rotate. When the urging member 29 has travelled to the right and has reached that point in the raceway 15 before the goal end to which it is intended to go at the furtherest, the arm 49 would have at such instant turned to such position that brush 52 is off arcual member 54, but brush 51 is still in contact with the arcual member 53. Upon breaking of contact between members 52 and 54, the motor circuit is opened and the movement of the urging member 29 will stop. This condition holds regardless of the position of arm 38 in the clockwise direction aforesaid. Now, upon turning wheel 36 counterclockwise, so that brushes 43 and 44 will contact arcual segments 41 and 42 respectively, and brush 45 will contact with the free end of the rheostat 47, the motor circuit is closed and its rotation is reversed, with like features of control as was explained for the first manipulated movements of the wheel 36. A similar circuit is adaptable for the motor 28.

It is intended that as soon as one of the live fish 18 reaches the goal point, meaning the right end of its raceway 15, some sort of signal shall come into play to announce such fact and thus indicate the winner. For this purpose, an electric "eye" and a co-operating light source indicated by the numerals 55 and 56 respectively, are provided to actuate an annunciator or other suitable signalling means 57, adapted for continuous operation after once being actuated, which is accomplished by the use of a trip relay indicated generally by the numeral 58. It is also intended that as soon as one of the live fish 18 reaches its goal, all the controls 35 shall immediately become inoperative. For this purpose, the electric "eye" circuit is also made to control a circuit breaker indicated generally by the numeral 59, which cuts off the current from the main lines 60 and 61. A trip relay 62 is also included to maintain the circuit breaker 59 in "open" condition.

So as soon as one of the live fish 18 reaches the goal, meaning that it reaches the electric "eye" 55, circuits shown in Fig. 7, are actuated as follows. Said "eye," upon change of the light condition upon it due to passage of the fish 18 between members 55 and 56, will cause cessation of current flow in micro-ampere relay 63, which in turn will cause the actuation of the current relay 64, whose armature 65 will move away from and break its contact with point 66, and move towards and make contact with point 66'. Such movement of said armature 65 will simultaneously cause the actuation of the trip relay 62, and of the trip relay 58. Of course, each electric "eye" 55 is in an identical circuit as illustrated in Fig. 7, and all the circuit breakers 59, for there is one as to each raceway, are connected in series in one of the main current lines, namely 60, as in Fig. 6; said circuit breakers 59, in Fig. 6, are connected in series, and are of the several circuits which are duplicates of Fig. 7. Upon operation of any of said circuit breakers to "open" condition, all of the motors, 27, 27' and 27" will cease rotation, for such "open" condition will open the circuits of all of said motors, for it would "open" the line 60.

The movement of the gate operating rod 32 may be effected by the use of a solenoid 71, whose circuit is controlled by a switch (not shown) operated by the attendant, and a main switch 72 interposed in line 61, is closed only while the gates 31 are lifted, and open, when said gates are lowered; movement of the rod 32 operating said switch 72.

The entire wiring diagram for the control of the operation of the motors 27, 27' and 27", though not set forth in full for all said three motors, comprises, a circuit shown to the left of the numerals 90 and 60' including the motor 27, an identical circuit for motor 27' from the numerals 90' and 60', and an identical circuit for motor 27" from the numerals 90" and 60"; said numerals 60', 90' and 90", indicating points of connection. Also each of said motors is in an individual circuit, each identical, as in Fig. 8. Also the wiring includes an electric "eye" circuit, one for each of the raceways, each identical with the circuit shown in Fig. 7, the circuit breakers 62 of which, are connected in series as shown in Fig. 6; the terminals of said circuit breakers 59, which are in series connection, being indicated in Fig. 7, by the numerals 91 and 92.

In operation, the players place their respective entries into the raceways 15, 15' and 15" through the openings 30, and go to their controls 35. The urging members 29 are at rest through the slitted partitions 33. The gates 31 are in lowered position within the raceways as shown by dotted lines in Fig. 5. The fish 18 are in the wtaer between the said members 31 and 33. The switch 72 is in "open" condition for its operating arm is upward as indicated by dotted lines and the numeral 72' in Fig. 5. The arms 38 are in neutral position, meaning, none of the brushes they carry are in contact with any of the arcual members of the reversing switch indicated generally by the numeral 73. The automatic cut-off switch is set so that its arm 49 is in such position that its brush 52 is in contact only with the segment 54 which establishes the circuit permitting rotation of the motor in such direction that the urging members will be moved towards the goal end of the raceways. The plates 34 are at the goal ends of the raceways, at rest beyond the line of the electric "eyes" 55. All the motors are at rest. The automatic cut-off switch of the type as 48 which controls the motor 28, is in position to permit the establishment of the circuit for rotation of said motor only in such direciton that the plates 34 would be moved towards the starting point of the raceways. The circuit breakers 59 are closed. The circuits of the annunciators 57 are open. In fact, the arrangement of the raceways before the race is begun, is as shown in Fig. 2 (for the time being disregard the members numbered 75 and 76) and the condition of the several circuits and the apparatus therein included is as illustrated in the Figs. 6 and 7. We are now ready to begin.

The attendant now causes the lifting of the gates 31 by closing the circuit of the solenoid 71, whereupon main switches 72 are closed as shown by the full line drawing in Fig. 5. The raceways are unobstructed and the fish 18 is at liberty to swim to the goal. The players, now manipulate the movement of the urging members 29, by rotary movement of their respective control wheels 36. These members 29 may be baited, and may act as either lures or chasers of the fish 18. Movement of members 29, may cause the fish 18 to swim behind them, or run away from them. It is evident that each player may impart a reciprocating movement to the urging member he controls by successive reversals of rotation of the motor 27, 27' or 27" which he controls. As soon as any one fish 18 passes the electric eye 55 associated with its raceway, the proper annunciator or other signal means 57 will become actuated, thus announcing the winner and the end of the race. The trip relay 58 having been actuated due to the "electric eye" action, will maintain the annunciator circuit closed, and simultaneously, the associated circuit breaker 59 will assume "open" condition due to action of the trip relay 62 actuated by the "electric eye" action. All motors stop. The controls 35 are inoperative. The respectve urging members 29 may be anywhere along their line of travel.

The attendant now manually resets the relays 58 and 62 and the annunciator pointer to initial condition, whereby the circuit-breaker 59 caused to be opened by the winning fish 18 is now closed.

The arms 38 are now shifted so that brushes 43 and 44 contact segments 41 and 42 respectively, until the urging members 29 return to starting position, whereupon all motors 27, 27' and 27" stop. The attendant now opens the switches 72, and all arms 38 are set in vertical neutral position by moving the control wheels 36.

The attendant now operates motor 28 to cause movement of the pusher members 34, to bring the fish 18 back to starting point; said members 34 automatically ceasing their leftward movement due to action of the automatic cut-off switch of the type 48, included in the control circuit of motor 28. The fish are now withdrawn from the raceways, if desired. The members 34 come to rest immediately before the plane of the gates 31, so that said gates may be caused to be lowered into the raceways, and the attendant then operates the motor 28 in reverse, so that the pusher members 34 shall return to their rest position at the right ends of the raceways. The apparatus is now restored to initial condition and is ready for the next race.

The forward movement of the fish urging members 29, may be limited to cease a substantial distance before the goal line, so that the fish 18 may be entirely on its own during the last part of the race. It is also noted, that sometimes a fish 18, will speedily dart to the goal line immediately upon the raising of the gates 31, and this would be so fast that the race would be over before the other entries hardly budged along their respective raceways, or even before any of the players have a chance to manipulate their controls 35. To avoid such condition, the raceways may be provided with an intermediate partition 76, which is really a perforated gate, which is lifted out of the raceway through an opening 77 in the top of the raceway, by the action of a solenoid 78, in whose circuit is a toggle switch 79 adapted to be closed when arm 75 is pushed up by the urging member 29 when the latter passes it. It is evident that the fish 18 would be delayed at the intermediate gate 76, until it is raised as aforesaid, which action, of course is controlled by the player at the control 35. With this set up, to restore the apparatus to initial condition before a second race is conducted, the very last thing for the attendant to do, as to each raceway, is to reset the switch 79, so that arm 75 is again interposed into path of the member 29, whereupon said switch will open the circuit of the solenoid 78, and the gate 76 will fall into lowered position into the raceway.

It may also be desirable to interpose one or more partial obstructions in the path of the fish, which it would need to hurdle. Such may be in the form of a low wall indicated by the numeral 80, and made of rubber or other suitable substance, secured only to the floor of the raceway, so that normally, said element 80 shall stand upright, but will be bent downward by the members 29 and 34, when either of them passes said hurdle element 80 within the raceway, to permit their passage.

This invention is capable of numerous forms and various applications without departing from the essential features herein disclosed. It is therefore intended and desired that the embodiment shown herein be deemed illustrative and not restrictive, and that the patent shall cover whatever features of patentable novelty exist in the invention disclosed; reference being had to the following claims rather than to the specific description herein to indicate the scope of this invention.

I claim:

1. In an apparatus of the character described, in combination, a raceway for holding water for a live fish, a gate near the starting end of the raceway to bar passage of the fish, means to clear the raceway of the gate, a member positioned within the raceway adapted to be moved therealong to urge the fish by either chasing it or luring it along the raceway; said urging member being of a size to permit the fish to pass it within the raceway, means to move the urging member in either direction along the raceway, and means to control said urging member moving means, operable from a distance from the raceway.

2. An apparatus as in claim 1, including means to alter the velocity of the urging member, operable at the control means.

3. An apparatus as in claim 1, characterized in that the means to move the urging member is adapted to be actuated only when the raceway is clear of the gate.

4. An apparatus as in claim 1, including a slitted flexible partition positioned within the raceway to bar the fish; the urging member being adapted to distort and pass through a slit in said partition; the gate, when within the raceway, lying between said partition and the goal end of the raceway.

5. An apparatus as in claim 1, including a member positioned within and substantially partitioning the raceway and moveable therealong, adapted to push the fish towards the starting end of the raceway; said member lying normally at the goal end of the raceway, and means to move said pusher member along the raceway, operable from a distance from the raceway.

6. An apparatus as in claim 1, including means to limit the range of movement of the urging member.

7. An apparatus as in claim 1, including a member positioned within and substantially partitioning the raceway and moveable therealong, adapted to push the fish towards the starting end of the raceway, means to move said pusher member along the raceway, operable from a distance from the raceway and means to limit the range of movement of the pusher member.

8. An apparatus as in claim 1, including means to indicate that the fish has reached the goal end of the raceway and simultaneously make the urging member moving means inoperative, adapted to become automatically actuated by the approach of the fish at the goal end of the raceway.

9. In an apparatus of the character described, in combination, a number of raceways for holding water for a live fish in each of them, gates positioned, one near the starting end of each of the raceways to bar passage of the respective fish, means to simultaneously clear the raceways of the gates, members positioned, one within each of the raceways adapted to be moved therealong to urge the respective fish by either chasing them or luring them respectively along the raceways; each urging member being of a size to permit the fish to pass it within the raceway, individual means to independently move the respective urging members along the raceways in either direction and individual means to independently control the respective moving means, each operative independently from a distance from the respective raceways.

10. An apparatus as in claim 9, including means to independently alter the velocities of the respective urging members, positioned at the respective control means.

11. An apparatus as in claim 9, characterized in that the means to move the respective urging members are adapted to be actuated only when all the raceways are clear of the gates.

12. An apparatus as in claim 9, including slitted flexible partitions positioned, one within each raceway to bar the respective fish; the urging members being adapted to distort and pass through a slit in the respective partitions; the gates when within the raceways, lying between said partitions and the goal ends of the raceways.

13. An apparatus as in claim 9, including members positioned within and substantially partitioning the respective raceways and moveable therealong, adapted to push the respective fish towards the starting ends of the raceways and means to move said pusher members along the raceways, operable from a distance from the raceways.

14. An apparatus as in claim 9, including means to limit the range of movement of the urging members.

15. An apparatus as in claim 9, including members positioned, one within and substantially partitioning each of the raceways and moveable therealong, adapted to push the fish towards the starting ends of the raceways, means to move said pusher members along the raceways, operable from a distance from the raceways and means to limit the range of movement of the pusher members.

16. An apparatus as in claim 9, including individual means to indicate that a fish has reached the goal end of the raceway in which it is and simultaneously make all the urging member moving means inoperative, adapted to become automatically actuated by the approach of any of the fish at the goal end of its raceway.

17. In an apparatus of the character described, in combination, a raceway for holding water for a live fish, a gate near the starting end of the raceway to bar passage of the fish, means to clear the raceway of the gate, a member positioned within and substantially partitioning the raceway and moveable therealong, adapted to push the fish towards the starting end of the raceway; said member lying normally at the goal end of the raceway, and means to move said pusher member along the raceway, operable from a distance from the raceway.

18. In an apparatus of the character described, in combination, a number of raceways for holding water for a live fish in each of them, gates positioned, one near the starting end of each of the raceways to bar passage of the respective fish, means to simultaneously clear the raceways of the gates, members positioned within and substantially partitioning the respective raceways and moveable therealong, adapted to push the respective fish towards the starting ends of the raceways, and means to move said pusher members along the raceways, operable from a distance from the raceways.

19. In an apparatus as in claim 1, including a second gate to bar passage of the fish, positioned between the first gate and the goal end of the raceway, and a means to clear the raceway of said second gate, automatically operable upon movement of the urging member a predetermined distance towards the goal end of the raceway.

20. In an apparatus as in claim 9, including other gates to bar passage of the fish, positioned, one within each raceway between its first gate and goal end, and individual means to clear the raceways of said second gates respectively, independently automatically operable upon movement of the respective urging members a predetermined distance towards the respective goal ends of the raceways.

21. In an apparatus of the character described, in combination, a raceway for a living thing capable of self-locomotion, a gate near the starting end of the raceway to bar passage of the living thing, means to clear the raceway of the gate, a member positioned within the raceway adapted to be moved therealong to urge the living thing by either chasing it or luring it along the raceway; said urging member being of a size to permit the living thing to pass it within the raceway, means to move the urging member in either direction along the raceway, and means to control said urging member moving means, operable from a distance from the raceway.

22. An apparatus as in claim 21, characterized in that the means to move the urging member is adapted to be actuated only when the raceway is clear of the gate.

23. An apparatus as in claim 21, including a slitted flexible partition positioned within the raceway to bar the living thing; the urging member being adapted to distort and pass through a slit in said partition; the gate, when within the raceway, lying between said partition and the goal end of the raceway.

24. An apparatus as in claim 21, including a member positioned within said substantially partitioning the raceway and moveable therealong, adapted to push the living thing towards the starting end of the raceway; said member lying normally at the goal end of the raceway, and means to move said pusher member along the raceway, operable from a distance from the raceway.

25. An apparatus as in claim 21, including means to limit the range of movement of the urging member.

26. An apparatus as in claim 21, including a member positioned within and substantially partitioning the raceway and moveable therealong, adapted to push the living thing towards the starting end of the raceway, means to move said pusher member along the raceway, operable from a distance from the raceway and means to limit the range of movement of the pusher member.

27. An apparatus as in claim 21, including means to indicate that the living thing has reached the goal end of the raceway and simultaneously make the urging member moving means inoperative, adapted to become automatically actuated by the approach of the living thing at the goal end of the raceway.

28. An apparatus as in claim 21, including a second gate to bar passage of the living thing, positioned between the first gate and the goal end of the raceway, and a means to clear the raceway of the second gate, automatically operable upon movement of the urging member a predetermined distance towards the goal end of the raceway.

29. In an apparatus of the character described, in combination, a number of raceways for a living thing capable of self locomotion in each of them, gates positioned, one near the starting end of each of the raceways to bar passage of the respective living things, means to simultaneously clear the raceways of the gates, members positioned, one within each of the raceways adapted to be moved therealong to urge the respective living things by either chasing them or luring them respectively along the raceways; each urging member being of a size to permit the living thing to pass it within the raceway, individual means to independently move the respective urging members along the raceways in either direction and individual means to independently control the respective moving means, each operative independently from a distance from the respective raceways.

30. An apparatus as in claim 29, including means to independently alter the velocities of the respective urging members, positioned at the respective control means.

31. An apparatus as in claim 29, characterized in that the means to move the respective urging members are adapted to be actuated only when all the raceways are cleared of the gates.

32. An apparatus as in claim 29, including slitted flexible partitions positioned, one within each raceway to bar the respective living things; the urging members being adapted to distort and pass through a slit in the respective partitions; the gates when within the raceways, lying between said partitions and the goal ends of the raceways.

33. An apparatus as in claim 29, including members positioned within and substantially partitioning the respective raceways and moveable therealong, adapted to push the respective living things towards the starting ends of the raceways and means to move said pusher members along the raceways, operable from a distance from the raceways.

34. An apparatus as in claim 29, including means to limit the range of movement of the urging members.

35. An apparatus as in claim 29, including members positioned, one within and substantially partitioning each of the raceways and moveable therealong, adapted to push the living things towards the starting ends of the raceways, means to move said pusher members along the raceways, operable from a distance from the raceways and means to limit the range of movement of the pusher members.

36. An apparatus as in claim 29, including individual means to indicate that a living thing has reached the goal end of the raceway in which it is and simultaneonsly make all the urging members moving means inoperative, adapted to become automatically actuated by the approach of any of the living things at the goal end of a raceway.

37. An apparatus as in claim 29, including other gates to bar passage of the living things, positioned, one within a raceway between the first gate and goal end, and individual means to clear the raceways of said second gates respectively, independently automatically operable upon movement of the respective urging members a predetermined distance towards the respective goal ends of the raceways.

38. In an apparatus of the character described, in combination, a raceway for a living thing capable of self locomotion, a gate near the starting end of the raceway to bar passage of the living thing, means to clear the raceway of the gate, a member positioned within and substantially partitioning the raceway and moveable therealong, adapted to push the living thing towards the starting end of the raceway; said member lying normally at the goal end of the raceway, and means to move said pusher member along the raceway, operable from a distance from the raceway.

39. In an apparatus of the character described, in combination, a number of raceways for living things capable of self locomotion in each of them, gates positioned, one near the starting end of each of the raceways to bar passage of the respective living things, means to simultaneously clear the raceways of the gates, members positioned within and substantially partitioning the respective raceways and moveable therealong, adapted to push the respective living things towards the starting ends of the raceways, and means to move said pusher members along the raceways, operable from a distance from the raceways.

IRVING I. LEVENSTEIN.